United States Patent Office 3,527,761
Patented Sept. 8, 1970

1

3,527,761
INDOLES
John L. Archibald, Windsor, and John Lambert Jackson, Henley-on-Thames, England, assignors, by mesne assignments, to John Wyeth & Brother Limited, Maidenhead, Berkshire, England, a British company
No Drawing. Filed May 15, 1968, Ser. No. 729,377
Claims priority, application Great Britain, May 24, 1967, 24,256/67; Mar. 1, 1968, 10,096/68
Int. Cl. C07d 29/38, 31/44
U.S. Cl. 260—293                                      22 Claims ABSTRACT OF THE DISCLOSURE
Indole derivatives of formula

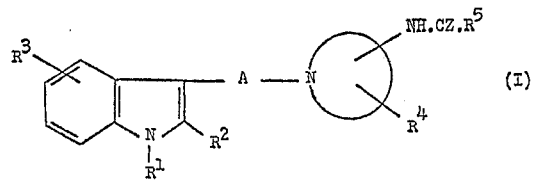

in which

represents a ring system of the general formula

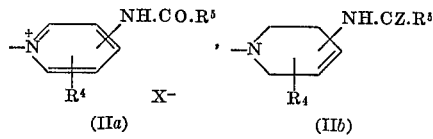

or

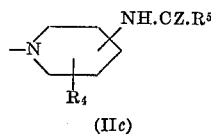

wherein $R^1$ represents hydrogen, lower alkyl, lower aralkyl or aroyl, $R^2$ represents hydrogen, lower alkyl or aryl, $R^3$ represents hydrogen, halogen, lower alkoxy, hydroxy, or lower alkyl, $R^4$ represents hydrogen, or lower alkyl, $R^5$ represents aryl (including heterocyclic aryl), lower alkoxy, aryloxy, lower aralkyl, lower aralkyloxy or diaryllower alkyl, X is an anion, A represents a lower alkylene or mono- or di-keto lower alkylene radical containing up to 4 carbon atoms, and Z is an oxo (i.e., =O) group with the proviso Z in Formula II(c) may also represent two hydrogen atoms when A is lower alkylene and $R^5$ is aryl, are valuable hypotensives and anti-hypertensives; some are also anti-inflammatories, anti-histamines, and show CNS activity as anti-convulsants, sedatives, or depressants.

This invention relates to indole derivatives, to processes for the preparation thereof and to pharmaceutical compositions containing such derivatives.

The present invention provides compounds of the general formula

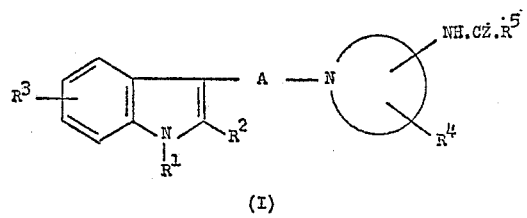

in which formula

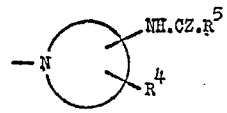

represents a ring system of the general formula

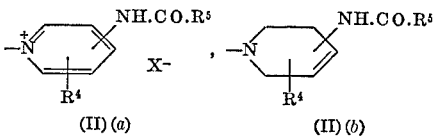

or

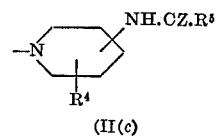

wherein $R^1$ represents hydrogen, lower alkyl, lower aralkyl or aroyl, $R^2$ represents hydrogen, lower alkyl or aryl, $R^3$ represents hydrogen, halogen, lower alkoxy, hydroxy or lower alkyl, $R^4$ represents hydrogen, halogen or lower alkyl, $R^5$ represents aryl (including heterocycl aryl), lower alkoxy, aryloxy, lower aralkyl, lower aralkyloxy or diaryl-lower alkyl, X is an anion, A represents a lower alkylene or mono- or di-keto lower alkylene radical containing up to 4 carbon atoms, and Z is an oxo (i.e., =O) group with the proviso that Z in Formula II(c) may also represent two hydrogen atoms when A is lower alkylene and $R^5$ is aryl.

The terms "lower alkyl" and "lower alkoxy" as used herein mean the radicals contain from 1 to 6, preferably 1 to 4, carbon atoms and the term "lower aralkyl" means the radical contains 7 to 10, preferably 7 to 9 carbon atoms. The "lower alkylene" group may be a branched or straight chain group, containing up to 4 carbon atoms. "A" preferably is an ethylene or acetyl group, but may, for example, be an isopropylene group.

Examples of $R^1$ are hydrogen, methyl, ethyl, n-propyl, isopropyl, n-butyl, isobutyl, benzyl, benzoyl and p-chlorobenzoyl. Preferably $R^1$ is a hydrogen atom. $R^2$ can be, for example, hydrogen, methyl, ethyl, n-propyl, isopropyl, n-butyl, isobutyl or substituted or unsubstituted phenyl and is preferably hydrogen or methyl. $R^3$ can be, for example, hydrogen, chlorine, methoxy, ethoxy, hydroxy, methyl, ethyl, n-propyl, isopropyl, n-butyl or isobutyl. Preferably $R^3$ is a hydrogen atom.

Examples of $R^4$ are hydrogen, chlorine, methyl, ethyl, n-propyl, isopropyl, n-butyl or isobutyl, though preferably $R^4$ is a hydrogen atom.

$R^5$ can be, for example, phenyl, substituted phenyl (e.g., phenyl substituted by halogen such as chlorine, by alkoxy, such as methoxy or ethoxy, by alkyl such as methyl or ethyl or by methylenedioxy), heterocyclic radicals (such as 3-indolyl, 2-thienyl or 2-furyl), methoxy, ethoxy, phenoxy, benzyl, benzyloxy and diphenylmethyl.

X is preferably a halide ion such as a chloride or bromide.

The novel compounds provided by the invention have pharmacological properties and also are useful as intermediates for the preparation of other compounds having pharmacological properties. The compounds exhibit action on the cardiovascular system, including hypotensive and/or anti-hypertensive activity. Additionally, some of the compounds exhibit anti-inflammatory activity, antihistamine activity, and central nervous system activity (such as sedative and anti-convulsant activity when tested on warm-blooded laboratory animals.

The compounds of general Formula I can be prepared in a number of ways by building up the molecule from suitable starting materials in known manner.

A first general method of preparation comprises reacting a compound of the general formula

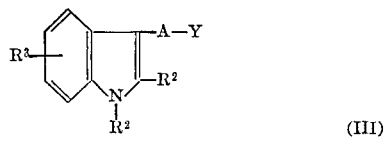

(III)

with a compound of the general formula

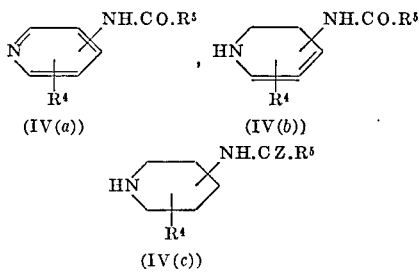

where $R^1$, $R^2$, $R^3$, $R^4$, $R^5$, Z and A have the meanings defined above and Y is a halogen atom or an equivalent radical, e.g., an organic sulphonyl radical such as a tosyl radical, and if necessary, reducing.

The starting materials of general Formula III are known compounds or can be made following the methods known for preparing compounds of this type, e.g., by reducing the corresponding carboxyl compounds followed by halogenation. The starting material of general Formula IV(c) preferably is prepared by forming the oxime of an N-benzyl-4-piperidone, reducing to give the N-benzyl-4-aminopiperidine, acylating with a compound of general formula $R^5COOH$ (where $R^5$ has the meanings defined above) and then hydrogenolysing.

The compounds of general Formula IV(a), (b), and (c) can be prepared by acylating a corresponding amino compound of the general formula

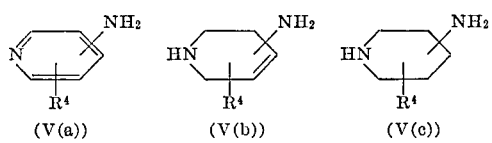

with a reactive derivative of an acid of general formula $R^5COOH$ (where $R^4$ and $R^5$ have the meanings defined above) and if necessary reducing.

A second general method of preparation (when Z is an oxo group) comprises acylating a compound of the general formula

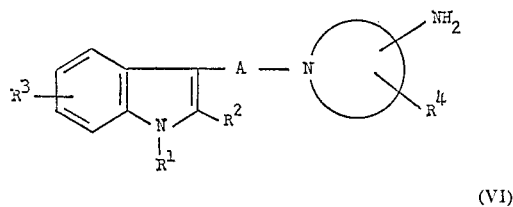

(VI)

(in which formula

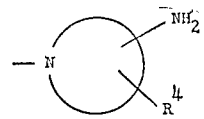

is a ring system of the general formula

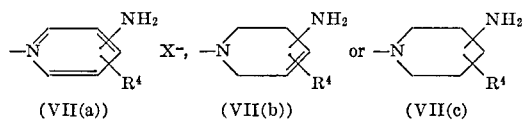

where $R^1$, $R^2$, $R^3$, $R^4$, A and X have the meanings defined above) with a reactive derivative of an acid of general formula $R^5COOH$ (where $R^5$ has the meanings defined above). Where a reactive derivative of the acid of formula $R^5COOH$ is used in a process described above, we have found it preferable usually to use a halide (for example, the chloride or bromide) or an anhydride.

The starting materials of general Formula VI generally can be prepared by hydrolysing (e.g., with a mineral acid such as hydrochloric acid) a corresponding acylamido (e.g., acetamido) compounds of the general formula

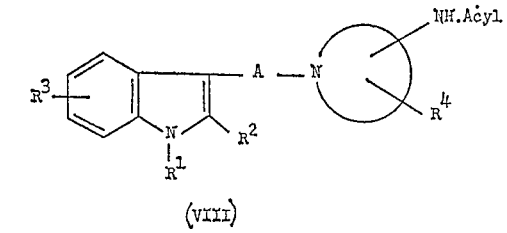

(VIII)

where

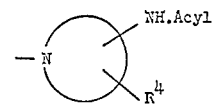

is a

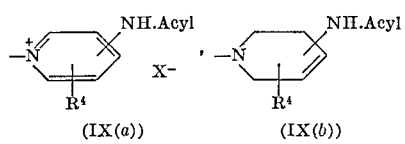

or

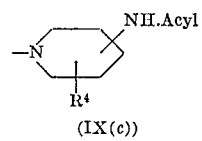

(IX(c))

ring and $R^1$, $R^2$, $R^3$, $R^4$ and X have the meanings defined above and acyl is an acyl, e.g., acetyl radical. (The compounds of general Formula VIII can be prepared following the information given above but using the appropriate acylating agent.) Alternatively the starting materials of general Formula VI can generally be prepared by reacting a compound of general Formula III with a compound of general Formula V(a), (b), or (c) and if desired then effecting reduction. These starting materials of general Formula VI usually exhibit central nervous system activity.

Once a pyridinum compound of general Formula (I) (i.e., in which

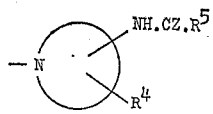

represents a ring system of general Formula II(a)) has been prepared, it may be selectively reduced to one of the other compounds. For example, a pyridine ring system of general Formula II(a) may be reduced with an alkali metal borohydride to a tetrahydropyridine ring system of general Formula II(b). On the other hand, catalytic hydrogenation, e.g., in tht presence of Raney nickel or platinum, or careful reduction with a hydride transfer agent (such as lithium aluminum hydride) causes a piperidine ring system of general Formula II(c), in which Z is an oxo group, to be formed. More drastic reduction with lithium aluminium hydride, e.g., on the tetrahydropyridine ring system, also causes reduction of the double bonded oxygen group (a) to give a ring system of Formula II(c) in which Z represents two hydrogen atoms.

Similarly, the starting materials of general Formula VI, where the amino-substituted ring system is of Formula VII(b) or VII(c), can be prepared by reducing the corresponding higher oxidation state ring systems of Formula VII(a) or (b), as the case may be.

The tetrahydropyridine and piperidine compounds of general Formula I can be prepared by carrying out a Fischer indole synthesis on a compound of general Formula

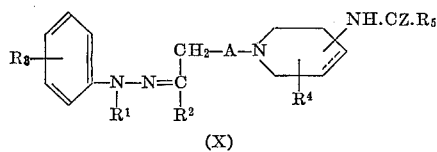

(X)

This starting material can be prepared by condensing a phenylhydrazine of Formula

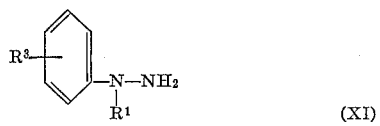

(XI)

with an aldehyde or ketone of general Formula

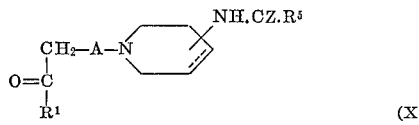

(XII)

in which formulae $R^1$, $R^2$, $R^3$, $R^4$, $R^5$, A and Z have the meanings defined above.

Once a compound of general Formula I, in which $R^1$ is in hydrogen has been prepared derivatives thereof may be prepared by alkylation, aralkylation or aroylation at the 1-position. For example, an alkali metal salt (e.g., the sodium salt) can be prepared and reacted with an alkyl or aralkyl halide or with an aroylating agent.

If desired, a salt can be used instead of the basic compounds in many of the above reactions, as is well known in the art.

The reactions outlined above usually are carried out in an organic solvent which is inert under the reaction conditions, for example, methanol, ethanol or dimethoxyethane. The most suitable solvent is chosen and varies depending on the particular reactants being used. If necessary heating the reactants in solution under reflux can be carried out. If necessary, reactive substituent groups can be blocked during a reaction and released later.

Since the novel tetrahydropyridine and piperidine compounds provided by the invention contain a basic nitrogen atom they can form acid addition salts with acids (e.g., hydrochloric acid) or quaternary ammonium salts, e.g., with alkyl halides (for example, methyl bromide or chloride) and the invention also provides such salts.

The invention also provides a pharmaceutical composition comprising a compound of general Formula I or a non-toxic acid addition or quaternary ammonium salt, when formed, of a novel compound of the invention, and a pharmaceutically acceptable carrier. The carrier may be a solid or liquid and any carrier known in the art may be used. The particular dosage will depend on the compound used, chosen route of administration, and standard pharmaceutical practise. For example, the compounds may be administered orally in the form of solutions, or they may be injected parenterally in the form of sterile solutions containing other solutes. As is usual, the compounds are administered at a concentration level which will afford effective results without causing any harmful or deleterious side effects. The actual dosage used will depend on the activity of the compound used and the condition of the patient to whom the compound is administered.

The non-limiting examples which follow illustrate the invention. There are a number of equally correct ways of naming the compounds of general Formula I, and we have preferred to name the pyridinium compounds taking the pyridine ring as the basic unit and to name the tetrahydropyridine and piperidine compounds taking the indole moiety as the basic unit. For example, although we prefer the name 3 - [2-(4-[4-chlorobenzamido]-1,2,5,6-tetrahydropyrid-1-yl)ethyl]indole for the compound of Example 9, it could alternatively be named 1-(2-indol-3-yl)ethyl-4-(4-chlorobenzamido)-1,2,5,6-tetrahydropyridine. Similarly, we prefer to name the corresponding piperidine compound of Example 14 as 3-[2-4-(4-chlorobenzamido]-1-piperidyl)ethyl]indole rather than 4-(4-chloro)benzamido-1-(2-indol-3-yl)ethyl-piperidine.

EXAMPLE 1

4-benzamido-1-[2-(3-indolyl)ethyl]pyridinium bromide

A solution of 4-benzamidopyridine (1.98 g.) and 3-(2-bromoethyl)indole (2.24 g.), in absolute ethanol (15 ml.) was refluxed for 2 hours and the crystalline product (3.13 g.) was collected by filtration from the hot solution. Recrystallization from ethanol-water gave the title compound as a hydrate, M.P. 267–269° C.

Found (percent): C, 60.26; H, 4.98; N, 9.48; Br, 18.45. $C_{22}H_{20}BrN_3O \cdot H_2O$ requires (percent): 60.07; H, 5.04; N, 9.45; Br, 18.15.

The 4-benzamidopyridine was prepared by adding benzoyl chloride dropwise to an ice-cooled solution of 4-aminopyridine in pyridine. The corresponding starting materials for Examples 2 to 5 were made in a similar manner.

EXAMPLE 2

3-benzamido-1-[2-(3-indolyl)ethyl]pyridinium bromide

The procedure of Example 1 was followed by utilizing 3-benzamidopyridine in place of 4-benzamidopyridine. The title compound was obtained in 77% yield as pale yellow prisms, M.P. 266–7° C.

Found (percent): C, 62.33; H, 4.92; N, 9.96; Br, 18.79. $C_{22}H_{20}BrN_3O$ requires (percent): C, 62.58; H, 4.76; N, 9.95; Br. 18.9.

The compound exhibits pronounced hypotensive action when tested by intravenous injection into laboratory animals at dosages of 150 mg./kg. It also shows anti-convulsant activity.

EXAMPLE 3

4-benzlyoxycarbonylamino-1-[2-(3-indolyl)ethyl]-pyridinium bromide 3-(2-bromoethyl)indole (1.12 g.) and 4-(benzyloxycarbonylamino)pyridine (1.14 g.) were refluxed in ethanol (12.5 ml.) for 5 hours. The crystals formed on cooling were filtered off, washed with ether, dried and recrystallized from ethanol to give the title compound as pale yellow crystals in 59% yield, M.P. 176–178° C.

Found (percent): C, 60.86; H, 5.03; N, 9.52; Br, 17.82. $C_{23}H_{22}BrN_3O_2$ requires (percent): C, 61.06; H, 4.90; N, 9.29; Br, 17.66.

EXAMPLE 4

4-(4-chloro)benzamido-1-[2-(3-indolyl)ethyl]-pyridinium bromide

The procedure of Example 1 was followed by using 4-(4-chloro)benzamidopyridine instead of 4-benzamidopyridine. Recrystallization from aqueous ethanol gave the title compound as yellow needles in 69% yield, M.P. 274–276° C.

Found (percent): C, 57.59; H, 4.39; N, 9.06. $C_{22}H_{19}BrClN_3O$ requires (percent): C, 57.84; H, 4.19; N, 9.20.

EXAMPLE 5

4-(2,2-diphenylacetamido)-1-[2-(3-indolyl)ethyl]-pyridinium bromide

The procedure of Example 1 was followed but using 4-(2,2-diphenylacetamido)pyridine instead of 4-benzamidopyridine. Recrystallization from a mixture of ethanol and ether gave the title compound as pale yellow crystals in 36% yield, M.P. 224–226° C.

Found (percent): C, 67.76; H, 5.29; N, 8.04; Br, 15.49. $C_{29}H_{26}BrN_3O$ requires (percent): C, 67.97; H, 5.12; N, 8.20; Br, 15.60%.

EXAMPLE 6

3-[2-(4-benzamido-1,2,5,6-tetrahydropyrid-1-yl)-ethyl]indole

Sodium borohydride (6.0 g.) was added over 30 minutes to a stirred suspension of 4-benzamido-1-[2-(3-indolyl)ethyl]pyridinium bromide (2.0 g.) in methanol (100 ml.). Stirring was continued 1 hour after the addition and the precipitated product filtered off, washed with cold methanol and dried to give 1.54 g. of the title compound in 97% yield, M.P. 209–211° C. after recrystallization from methanol.

Found (percent): C, 76.42; H, 6.60; N, 12.05. $C_{22}H_{23}N_3O$ requires (percent): C, 76.49; H, 6.71; N, 12.17.

This compound exhibits pronounced hypotensive action when administered intravenously to laboratory rats at dosages of 25 mg./kg. Additionally, it shows good anti-histamine activity and also acts as an anti-convulsant.

EXAMPLE 7

3-2-(3-benzamido-1,2,5,6-tetrahydropyrid-1-yl)-ethyl]indole 3-benzamido-1-[2-(3-indolyl)ethyl]pyridinium bromide was reduced with sodium borohydride, following the procedure of Example 6, to give the title compound in 86% yield as colorless crystals, M.P. 180–182° C. after recrystallization from acetonitrile.

Found (percent): C, 76.53; H, 6.91; N, 12.01. $C_{22}H_{25}N_3O$ requires (perecnt): C, 76.49; H, 6.71; N, 12.17.

This product showed hypotensive action when injected intravenously in cats at a level of 17 mg./kg. Additionally, it has anti-histamine activity.

EXAMPLE 8

3-[2-(4-benzyloxycarbonylamino-1,2,5,6-tetrahydro-pyrid-1-yl)ethyl]indole

4 - benzyloxycarbonylamino - 1-[2-(3-indolyl)ethyl]-pyridinium bromide was reduced with sodium borohydride, following the procedure of Example 6, to give the title compound in 69% yield, M.P. 162–164° C. after recrystallization from ethanol.

Found (percent): C, 73.41; H, 6.92; N, 11.21. $C_{23}H_{25}N_3O_2$ requires (percent); C, 73.57; H, 6.71; N, 11.19.

The compound has anti-histamine activity.

EXAMPLE 9

3-[2-(4-[4-chlorobenzamido]-1,2,5,6-tetrahydro-pyrid-1-yl)ethyl]indole

4 - (4 - chloro)benzamido - 1 - [2-(3 - indolyl)ethyl] pyridinium bromide was reduced with sodium borohydride, following the procedure of Example 6, to give the title compound in 37% yield, M.P. 229–230° C. after recrystallization from a mixture of ethanol and dimethyl sulphoxide.

Found (percent): C, 69.47; H, 5.97; N, 10.92; Cl, 9.48. $C_{22}H_{22}ClN_3O$ requires percent): C, 69.56; H, 5.85; N, 11.06; Cl. 9.34.

This product shows pronounced hypotensive action when injected intravenously into rats at a dosage level of 25 mg./kg. It also exhibits anti-histaminic action.

EXAMPLE 10

3-[2-(4-[2,2-diphenylacetamido]-1,2,5,6-tetrahydro-pyrid-1-yl)ethyl]indole

4 - (2,2 - diphenylacetamido) - 1-[2-(3-indolyl)ethyl]-pyridinium bromide was reduced with sodium borohydride, following the procedure of Example 6, to give the title compound in 83% yield, M.P. 197–198° C. after recrystallization from ethanol.

Found (percent): C, 79.83; H, 6.61; N, 9.81. $C_{29}H_{29}N_3O$ requires (percent): C, 79.96; H, 6.71; N, 9.65.

The product of this example shows anti-inflammatory action in the well-known rat paw oedema test.

EXAMPLE 11

3-[2-(4-benzylaminopiperid-1-yl)ethyl]indole

3 - [2 - (4 - benzamido-1,2,5,6-tetrahydropyrid-1-yl)-ethyl]indole (3.45 g.) was added over 30 minutes to a stirred suspension of lithium aluminium hydride (2.26 g.) in 1,2-dimethoxyethane (100 ml.), and the mixture was refluxed for 22 hours and then allowed to cool. The excess lithium aluminium hydride was decomposed by dropwise addition of water (6.8 mls.) with stirring. The mixture was filtered, the inorganic precipitate washed thoroughly with fresh 1,2-dimethoxyethane and the bulked organic phases evaporated to give a pale yellow oil. After standing for 3 days, the oil became semi-crystalline. Trituration with acetone caused complete crystallization to give the title compound (650 mg.) of M.P. 132–4° C. after recrystallization from benzene/80–100° C. petrol.

Found (percent): C, 79.02; H, 8.06; N, 12.81. $C_{22}H_{23}N_3$ requires (percent): C, 79.24; H, 8.16; N, 12.60.

The product of this example shows good hypotensive action when administered intravenously to cats at 9 mg./kg. It also has anti-histaminic action and anti-tremor action.

EXAMPLE 12

3-[2-(4-benzamido-1-piperidyl)ethyl]indole 4-benzamido-1-[2-(3-indolyl)ethyl]pyridinium bromide (3.0 g.) was dissolved in 91% ethanol (300 ml.) containing triethylamine (0.08 g.) and freshly prepared W7 Raney nickel catalyst (ca. 3 g.) was added. The mixture was hydrogenated in an autoclave at 400 p.s.i. hydrogen pressure and 50° C. for 4 hours. After filtering off the catalyst the filtrate was evaporated in vacuo and the residue was shaken with a mixture of chloroform and 2 N sodium hydroxide solution. The resulting insoluble material was filtered off and dried to give 1.61 g. of product, M.P. 203–6° C. Recrystallization from ethanol gave the title compound as colorless needles (1.34 g.), M.P. 208–210° C.

Found (percent): C, 75.91; H, 7.42; N, 12.27. $C_{22}H_{25}N_3O$ requires (percent): C, 76.05; H, 7.25; N, 12.10.

The product of this example shows pronounced hypotensive action in cats at a dosage level (intravenous) of 3 mg./kg. and in rats at 15 mg./kg. Administered orally to rats at 75 mg./kg., it acts as an anti-hypertensive, causing a marked decrease in blood pressure. The compound shows good anti-histamine activity, antimorphine and antioxytremorine action, and shows good anti-inflammatory action in the paw oedema test.

EXAMPLE 13

3-[2-(3-benzamido-1-piperidyl)ethyl]indole 3-benzamido-1-[2-(3-indolyl)ethyl]pyridinium bromide was reduced following the procedure of Example 12 to give the title compound in 39% yield, M.P. 235–40° C. after recrystallization from aqueous ethanol.

Found (percent): C, 75.99; H, 7.41; N, 11.89. $C_{22}H_{25}N_3O$ requires (percent): C, 76.05; H, 7.25; N, 12.10.

This product showed moderate hypotensive activity in cats when administered intravenously at 17 mg./kg., and was also found to possess anti-histamine and anti-metrazol activity.

EXAMPLE 14

3[2-(4-[4-chlorobenzamido]-1-piperidyl)ethyl]indole

4 - (4 - chloro)benzamido-1-[2-(3-indolyl)ethyl]pyridinium bromide (2.0 g.) was suspended in 95% ethanol (300 ml.) containing triethylamine (2 ml.). Platinum oxide (200 mg.) was added and the mixture hydrogenated at 400 p.s.i. and 65° C. for 5 hours. The solution was filtered and the solvent removed in vacuo. The resulting residue was triturated with 2 N sodium hydroxide, the gum formed was dissolved in hot ethanol, diluted with water until faintly turbid and allowed to cool when pink needles separated out, (414 mg.). These were recrystallized twice from ethanol to give the title compound, M.P. 230–232° C.

Found (percent): C, 69.00; H, 6.46; N, 10.83; Cl, 9.03. $C_{22}H_{24}ClN_3O$ requires (percent): C, 69.20; H, 6.33; N, 11.01; Cl, 9.29.

This compound shows pronounced hypotensive action when tested intravenously in rats at 15 mg./kg., has good anti-histamine activity, is an anti-convulsant, and shows anti-inflammatory activity in the paw oedema test.

EXAMPLE 15

3-[2-(4-[4-methoxybenzamido]-1-piperidyl)ethyl]indole (a) A solution of 3-[2-(4-amino-1-piperidyl)ethyl]-indole hydrate (1.305 g.) in chloroform (20 ml.) was stirred with a solution of potassium bicarbonate (750 mg.) in water (10 ml.). The mixture was cooled in an ice bath and p-methoxybenzoyl chloride (950 mg.) in chloroform (5 ml.) was added dropwise. The resulting precipitate was filtered off, dissolved in ethanol and made acid with ethanolic HCl to precipitate the hydrochloride. Recrystallization from a mixture of ethanol and water gave the title compound as the hydrochloride, hydrate in 54% yield, M.P. 284–6° C.

Found (percent): C, 63.87; H, 7.06; N, 8.06; Cl, 9.83. $C_{23}H_{27}N_2O_2HCl.H_2O$ requires (percent): C, 63.95; H, 7.00; N, 8.21; Cl, 9.73.

This compound showed pronounced hypotensive activity when intravenously administered to cats at a dosage of 7.5 mg./kg. It also exhibited anti-histamine activity.

The starting material for this example was made as follows:

(b) A solution of 4-acetamidopyridine (42 g.) and 3-(2-bromoethyl)indole (61 g.) in absolute ethanol (400 ml.) was refluxed for 16 hours. 4-acetamido-1-[2-(3-indolyl)ethyl]-pyridinium bromide (78.3 g.) separated on cooling, M.P. of the enthanolate after crystallization from ethanol as the ethanolate was 202–3° C.

4-acetamido-1-[2-(3-indolyl)ethyl]pyridinium bromide (78.3 g.) was dissolved in 91% ethanol (1200 ml.) containing triethylamine (24.4 g.) and W7 Raney nickel catalyst (ca. 30 g.) was added. Hydrogenation was conducted in an autoclave at 70° C. and at an initial hydrogen pressure of 400 p.s.i. for 2 hours.

The catalyst was filtered off and the residue after evaporation of the filtrate was shaken with chloroform and 2 N sodium hydroxide solution. The chloroform layer was dried and evaporated in vacuo to give 3-[2-(4-acetamido-1-piperidyl)ethyl]indole as a colorless solid (44.0 g.), M.P. 167–8° C. after recrystallization from ethyl acetate.

3 - [2-(4-acetamido-1-piperidyl)ethyl]indole (43.0 g.) was dissolved in 2 N hydrochloric acid (430 ml.) and refluxed for 2½ hours. The reaction mixture was cooled, filtered and basified with 10 N sodium hydroxide to give 3-[2-(4-amino-1-piperidyl)ethyl]indole as the hydrate (36.4 g.), M.P. 106–110° C. after recrystallization from acetonitrile containing 1% water.

(c) Alternatively a solution of 3-(2-bromoethyl)indole (2.4 g.) in acetonitrile (20 ml.) was added dropwise during one hour to a refluxing solution of 4-aminopyridine in acetonitrile (25 ml.) and refluxing continued for 3 hours. The 4-amino-1-[2-(3-indolyl)ethyl]pyridinium bromide formed could be reduced with hydrogen in the presence of W7 Raney nickel to give 3-[2-(4-amino-1-piperidyl)ethyl]indole.

In a similar manner, 3-amino-1-[3-indolyl)ethyl]-pyridinium bromide, M.P. 190–192° C. and 2-amino-1-[2-(3-indolyl)ethyl]pridinium bromide, M.P. 228–230° C. could be prepared from 3-amino- or 2-amino-pyridine and 3-(2-bromoethyl)indole, and then reduced to give the corresponding 3-[2-(2- or 3-amino-1-piperidyl)ethyl]indoles.

EXAMPLE 16

3-[2-(4-[3-methoxybenzamido]-1-piperidyl)ethyl]indole

A solution of 3-[2-(4-amino-1-piperidyl)ethyl]indole hydrate (1.3 g.) in chloroform (25 ml.) was stirred with an ice cooled solution of potassium carbonate (1.38 g.) in water (10 ml.). m-Methoxybenzoyl chloride (950 mg.) in chloroform (10 ml.) was added dropwise, stirring was continued for 3 hours then the layers were separated. The aqueous layer was re-extracted with chloroform, the combined chloroform layers were dried and evaporated in vacuo and the crystalline residue was recrystallized from acetonitrile to give the title compound (1.42 g.) as prisms, M.P. 149–150° C.

Found (percent): C, 73.08; H, 7.33; N, 11.17. $C_{23}H_{27}N_3O_2$ requires (percent): C, 73.18; H, 7.21; N, 11.13.

This compound shows pronounced hypotensive action in rats when administered intravenously at 14 mg./kg. It also possesses anti-inflammatory and anti-histamine activity.

EXAMPLE 17

3-[2-(4-[2-methoxybenzamido]-1-piperidyl)ethyl]indole

By following the procedure of Example 16 but utilizing o-methoxybenzoyl chloride in place of m-methoxybenzoyl chloride, the title compound was obtained as pale yellow prisms in 50% yield, M.P. 152–154° C.

Found (percent): C, 73.35; H, 7.32; N, 11.22. $C_{23}H_{27}N_3O_2$ requires (percent): C, 73.18; H, 7.21; N, 11.13.

The product of this example shows pronounced hypotensive action in the rat when tested intravenously at 15.5 mg./kg. It also demonstrates anti-histamine and anti-inflammatory activity.

EXAMPLE 18

3-[2-(4-[3,4,5-trimethoxybenzamido]-1-piperidyl)ethyl]indole

The procedure of Example 16 was followed except that 4-(3,4,5-trimethoxy)benzoyl chloride was used instead of m-methoxybenzoyl chloride. Recrystallization from a mixture of ethanol and water gave fine needles of the title compound as the hydrate in 79% yield, M.P. 105–108° C.

Found (percent): C, 65.74; H, 7.17; N, 9.38. $C_{25}H_{31}N_3O_4 \cdot H_2O$ requires (percent): C, 65.91; H, 7.30; N, 0.23.

This compound shows pronounced hypotensive action when tested intravenously in rats at 7.5 mg./kg. Additionally, it shows anti-histamine and anti-inflammatory activity.

EXAMPLE 19

3-[2-(4-[indol-3-carboxamido]-1-piperidyl)-ethyl]indole

The procedure of Example 16 was followed but utilizing indole-3-carbonyl chloride instead of m-methoxybenzoyl chloride. The title compound was obtained as colorless microcrystals in 13% yield, M.P. 242–244° C. after recrystallization from aqueous acetone.

Found (percent): C, 74.44; H, 6.88; N, 14.30. $C_{24}H_{26}N_4O$ requires (percent): C, 74.58; H. 6.78; N, 14.50.

This compound was also prepared using indole-3-carboxylic acid and dicyclohexylcarbodiimide (i.e. indole-3-carboxylic acid anhydride in situ) as the acylating agent.

The product exhibits moderate hyptotensive effects in rats when tested intravenously at 35 mg./kg. It is very active as an anti-histamine, and is shown by the paw oedema test to be effective as an anti-inflammatory.

EXAMPLE 20

3-[2-(4-[2,2-diphenylacetamido]-1-piperidyl)-ethyl]indole

The procedure of Example 16 was followed but utilizing diphenylacetyl chloride instead of m-methoxybenzoyl chloride. The title compound was obtained as colorless plates in 56% yield, M.P. 160–162° C. after recrystallization from aqueous ethanol.

Found (percent): C, 79.43; H, 7.34; N, 9.71. $C_{29}H_{31}N_3O$ requires (percent): C, 79.60; H, 7.14; N, 9.60.

The compound shows anti-histamine, anti-serotonin, and anti-inflammatory action.

EXAMPLE 21

3-[2-(4-[2-methylbenzamido]-1-piperidyl)ethyl]indole

The procedure of Example 16 was followed but using o-toluoyl chloride as the acylating agent to give the title compound in 62% yield, M.P. 186–9° C.

Found (percent): C, 72.3; H, 7.7; N, 11.9. $C_{23}H_{27}N_3O$ requires (percent): C, 76.4; H, 7.5; N, 11.6.

The compound has anti-histamine and anti-morphine action, and is orally active as an anti-hypertensive agent when tested at 40 mg./kg. in rats.

EXAMPLE 22

3-[2-(4-[3-methylbenzamido]-1-piperidyl)ethyl]indole

The procedure of Example 16 was followed but using m-toluoyl chloride as the acylating agent to give the title compound in 56% yield, M.P. 172–4° C.

Found (percent): C, 72.3; H, 7.6; N, 11.6. $C_{23}H_{27}N_3O$ requires (percent): C, 76.4; H. 7.5; N, 11.6.

The compound shows hypotensive action when tested intravenously in rats at 19 mg./kg. It also shows anti-morphine activity and is quite active as an anti-histamine.

EXAMPLE 23

3-[2-(4-[4-methylbenzamido]-1-piperidyl)ethyl]indole

The procedure of Example 16 was followed but using p-toluoyl chloride as the acylating agent to give the title compound in 55% yield, M.P. 200–202° C.

Found (percent): C, 76.2; H, 7.5; N, 11.4. $C_{23}H_{27}N_3O$ requires (percent): C, 76.4; H, 7.5; N, 11.6.

This compound shows pronounced hypotensive action in rats when tested intravenously at 15 mg./kg. It is also strongly anti-histaminic and is shown by the paw oedema test to be effective as an anti-inflammatory.

EXAMPLE 24

3-[2-(4-[2-furylcarboxamido]-1-piperidyl)ethyl]indole

The procedure of Example 16 was followed but using furan-2-carbonyl chloride as the acylating agent to give the title compound, M.P. 146–8° C. in 81% yield.

Found (percent): C, 71.0; H, 6.95; N, 12.4. $C_{20}H_{23}N_3O_2$ requires (percent): C, 71.2; H, 6.9; N, 12.45.

This product showed moderate hypotensive activity when tested intravenously in rats at 15 mg./kg.; it was also found to possess anti-histaminic, anti-convulsant, anti-oxotremorine, and anti-inflammatory action.

EXAMPLE 25

3-[2-(4-[2-chlorobenzamido]-1-piperidyl)ethyl]indole

The procedure of Example 16 was followed but using o-chlorobenzoyl chloride as the acylating agent to give the title compound in 39% yield, M.P. 163–164° C.

Found (percent): C, 69.0; H, 6.2; N, 11.0. $C_{22}H_{24}ClN_3O$ requires (percent): C, 69.2; H, 6.3; N, 11.0.

This compound showed anti-histaminic and anti-morphine action.

EXAMPLE 26

3-[2-(4-[3,4-methylenedioxybenzamido]-1-piperidyl)-ethyl]indole

The procedure of Example 16 was followed but using 3,4-dioxymethylenebenzoyl chloride as the acylating agent to give the title compound in 58% yield, M.P. 189–190° C.

Found (percent): C, 70.4; H, 6.55; N, 10.8. $C_{23}H_{25}N_3O_3$ requires (percent): C, 70.6; H, 6.4; N, 10.7.

The compound has anti-histamine, anti-convulsant, and anti-tremor activity.

EXAMPLE 27

3-[2-(4-[2-carboxybenzamido]-1-piperidyl)ethyl]indole

3[2-(4-amino-1-piperidyl)ethyl]indole (2.0 g.) in chloroform (100 ml.) was stirred at room temperature while phtahlic anhydride (1.14 g.) was added in portions. After stirring for 2 hours the precipitate was collected and recrystallized from ethanol water to give the title compound as a hydrate (1.96 g.) M.P. 165–170° C.

Found (percent): C, 67.36; H, 7.06; N, 10.20. $C_{23}H_{25}N_3O_3 \cdot H_2O$ requires (percent): C, 67.46; H, 6.64; N, 10.26.

EXAMPLE 28

3-[2-(4-[3-trifluoromethylbenzamido]-1-piperidyl)-ethyl]indole

The procedure of Example 16 was followed but replacing m-methoxybenzoyl chloride by m-trifluoromethylbenzoyl fluoride to give the title compound in 56% yield, M.P. 186–8° C.

Found (percent): C, 66.4; H, 6.0; N, 10.1. $C_{23}H_{24}F_3N_3O$ requires (percent): C, 66.5; H, 5.8; N, 10.1.

This compound shows anti-histaminic, anti-inflammatory anti-morphine, and anti-tremor activity.

EXAMPLE 29

3-[2-(4-[4-phenylbenzamido]-1-piperidyl)ethyl]indole

The procedure of Example 16 was followed, but replacing m-methoxybenzoyl chloride by p-phenylbenzoyl chloride to give the title compound as the monohydrate in 44% yield, M.P. 271–2° C.

Found (percent): C, 78.9; H, 6.95; N, 10.1 $C_{28}H_{29}N_3O$ requires (percent): C, 78.6; H, 6.95; N, 9.8.

The compound has anti-histamine action.

EXAMPLE 30

3-[2-(4-[4-phenylacetamido]-1-piperidyl)ethyl]-indole

The procedure of Example 16 was followed, but replacing the m-methoxybenzoyl chloride by phenylacetyl chloride to give the title compound in 58% yield, M.P. 165–8° C.

Found (percent): C, 76.3; H, 7.7; N, 11.7. $C_{23}H_{27}N_3O$ requires (percent): C, 76.4; H, 7.5; N, 11.65.

EXAMPE 31

3-L[2-(4-benzamido-1-piperidyl)ethyl]-2-methyl-indole (a) 3-(2-bromoethyl)-2-methylindole (2.38 g.) in ethanol (25 ml.) was refluxed with 4-acetamidopyridine (1.36 g.) for 6½ hours. 4-acetamido-1-[2-(2-methylindol-3-yl)ethyl]-pyridinium bromide, M.P. 205–207° C. (2.24 g., 60%) separated on cooling. This quaternary bromide (14.4 g.) was suspended in 95% ethanol containing triethylamine (15 ml.) and W7 Raney nickel (about 10 g.) and hydrogenated for 4 hours at 400 p.s.i. and 75° C. Filtration from catalyst, evaporation of the filtrate and trituration with 2N sodium hydroxide solution (100 ml.) gave 3-[2-(4-acetamido-1-piperidyl)ethyl]-2-methylindole (10.12 g., 76%), M.P. 83–85° C.

The acetamido compound (8.57 g.) was refluxed in 2 N HCl (200 ml.) for 2½ hours. After cooling, the solution was made strongly basic, extracted into chloroform, heated with charcoal, filtered and evaporated to give 3-[2-(4 - amino-1-piperidyl)ethyl]-2-methylindole as a brown foam (7.02 g., 95%).

(b) The brown foam 1.3 g.) in chloroform (20 ml.) was stirred with potassium carbonate (1.38 g.) in water (10 ml.) and ice-cooled while benzoyl chloride (703 mg.) in chloroform (15 ml.) was added slowly dropwise. Stirring was continued for 2 hours then the aqueous phase was separated and re-extracted with chloroform. The combined organic phases were dried, charcoaled and evaporated. The resulting foam solidified on trituration with ether to give 3-[2-(4-benzamido-1-piperidyl)ethyl]-2-methylindole as yellow microcrystals (1.21 g., 67%). It was recrystallized from aqueous ethanol as needles, M.P. 209–211° C.

Found (percent): C, 76.26; H, 7.71; N, 11.63.

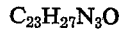

$C_{23}H_{27}N_3O$ requires (percent): C, 76.42; H, 7.53; N, 11.63.

This compound shows moderate anti-hypertensive action when tested orally in rats at 75 mg./kg.; it also exhibits anti-histamine and anti-morphine activity.

EXAMPLE 32

3-[2-(4-[4-methoxybenzamido]-1-piperidyl)ethyl]-2-methylindole

The procedure of Example 31(b) was followed but using p-methoxybenzoyl chloride in place of benzoyl chloride to give the title compound as prisms of monohydrate which were recrystallized from ethanol (55% yield), M.P. 110–114° C.

Found (percent): C, 70.52; H, 7.81; N, 10.04.

$C_{24}H_{29}N_3O_2 \cdot H_2O$ requires (percent) C, 70.39; H, 7.63; N, 10.26.

This compound exhibits anti-histamine and anti-morphine activity.

EXAMPLE 33

3-[2-(4-[4-chlorobenzamido]-1-piperidyl)ethyl]-2-methylindole

The procedure of Example 31(b) was followed but using p-chlorobenzoyl chloride in place of benzoyl chloride to provide the title compound as the hydrochloride in 34% yield, M.P. 243–245° C. after recrystallization from ethanol ether.

Found (percent): C, 63.80; H, 6.38; Cl, 16.25.

$C_{23}H_{26}ClN_3O \cdot HCl$ requires (percent): C, 63.89; H, 6.30; Cl, 6.40.

This compound shows anti-histaminic, anti-tremor, and anti-inflammatory activity.

EXAMPLE 34

3-[2-(4-benzamido-1-piperidyl)ethyl]-1-methylindole (a) 3-[2-(4-amino-1-piperidyl)ethyl]indole (13.05 g.) was added portionwise to sodamide in liquid ammonia (from 2.5 g. sodium and ca. 500 ml. ammonia). After stirring for 1 hour, methyl iodide (7.8 g.) in dry ether (100 ml.) was added dropwise. Stirring was continued until the ammonia had evaporated, then water (100 ml.) was added dropwise to the residue. The resulting solid was collected and recrystallized from acetonitrile containing 1% water to give 3-[2-(4-amino-1-piperidyl)ethyl]-1-methylindole as the hydrate (10.16 g.), M.P. 102–4° C.

(b) A mixture of this amine (2.0 g.) in chloroform (40 ml.) and potassium carbonate (2.0 g.) in water (20 ml.) was stirred vigorously and ice-cooled while benzoyl chloride (1.15 g.) in chloroform (10 ml.) was added slowly dropwise. Stirring was continued for 2 hours, then the aqueous layer was separated and re-extracted twice with chloroform. The combined chloroform layers were dried (MgSO$_4$) and evaporated to give a colorless solid (2.67 g.). Recrystallization from aqueous ethanol provided the title compound as colorless needles (1.60 g.), M.P. 178–179° C.

Found (percent): C, 76.39; H, 7.64; N, 11.48.

$C_{23}H_{27}N_3O$ requires (percent): C, 76.42; H, 7.53; N, 11.63.

The product of this example has anti-histamine, anti-morphine, and anti-inflammatory activity.

EXAMPLE 35

3-[2-(4-[4-chlorobenzamido]-1-piperidyl)ethyl]-1-methylindole

The procedure of Example 34(b) was followed but replacing the benzoyl chloride by p-chlorobenzoyl chloride to give the tile compound in 71% yield, M.P. 212–214° C.

Found (percent): C, 69.8; N, 6.8; N, 10.5.

$C_{23}H_{26}ClN_3O$ reqiures (percent): C, 69.8; H, 6.6; N, 10.6.

The compound has anti-histamine and anti-convulsant action.

EXAMPLE 36

3-[2-(4-[4-methylbenzamido]-1-piperidyl)ethyl]-1-methylindole

The procedure of Example 34(b) was followed but replacing the benzoyl chloride by p-toluoyl chloride to give the title compound is 71% yield. M.P. 198–199° C.

Found (percent): C, 76.6; H, 7.9; N, 11.2. $C_{24}H_{29}N_3O$ requires (percent): C, 76.8; H, 7.8; N, 11.2.

This compound has anti-histamine and anti-convulsant properties.

EXAMPLE 37

3-[2-(4-[4-methoxybenzamido]-1-piperidyl)ethyl]-1-methylindole

The procedure of Example 34(b) was followed but replacing the benzoyl chloride by p-methoxybenzoyl chloride to give the title compound in 73.5% yield, M.P. 198–199° C.

Found (percent) C, 73.6; H, 7.6; N, 10.5. $C_{24}H_{29}N_3O_2$ requires (percent): C, 73.6; H, 7.5; N, 10.4.

The compound acts as an anti-histamine and as an anti-inflammatory.

EXAMPLE 38

3-[2-(4-benzamido-1-piperidyl)ethyl]-1-benzyl-indole (a) 3-[2-(4-amino-1-piperidyl)ethyl]indole (2.61 g.) was added to sodamide in liquid ammonia prepared from sodium (500 mg.) and liquid ammonia (ca. 100 ml.). After ½ hour, benzyl chloride (1.39 g.) in ether (20 ml.) was added dropwise. Stirring was continued until the ammonia evaporated. The 1-benzyl derivative formed was isolated by extraction with chloroform as a brown oil (2.95 g.).

(b) The crude derivative (2.56 g.) in chloroform (40 ml.) was stirred with potassium carbonate (2.1 g.) in water (20 ml.) and treated dropwise with benzoyl chloride (1.17 g.) in chloroform (10 ml.). The aqueous layer was re-extracted with chloroform and the combined extracts were dried and evaporated to give a brown solid (3.44 g.). Recrystallization from aqueous ethanol gave the title compound as colorless microcrystals (1.52 g.), M.P. 152–153° C.

Found (percent): C, 79.80; H, 7.21; N, 9.76. $C_{29}H_{31}N_3O$ requires (percent): C, 79.60; H, 7.14; N, 9.60.

The product is an effective anti-inflammatory and antihistamine and also shows anti-convulsant activity.

EXAMPLE 39

3-[2-(4-[4-chlorobenzamido]-1-piperidyl)ethyl]-1-benzylindole

The procedure of Example 38(b) was followed but replacing the benzoyl chloride by p-chlorobenzoyl chloride to give the title compound in 57% yield, M.P. 193–4° C.

Found (percent): C, 73.7; H, 6.3; N, 8.8. $C_{29}H_{30}ClN_3O$ requires (percent): C, 73.8; H, 6.4; N, 8.9.

This compound possesses anti-histamine activity and is also a depressant.

EXAMPLE 40

3-[2-(4-[4-methoxybenzamido]-1-piperidyl)ethyl]-1-benzylindole

The procedure of Example 38(b) was followed but replacing the benzoyl chloride by p-methoxybenzoyl chloride to give the title compound in 61% yield, M.P. 191–2° C.

Found (percent): C, 76.7; H, 7.4; N, 8.9. $C_{20}H_{33}N_3O_2$ requires (percent): C, 77.05; H, 7.1; N, 9.0.

This compound possesses anti-histamine and anti-serotonin activity.

EXAMPLE 41

3-[2-(4-benzamido-1-piperidyl)-1-oxoethyl]indole (a) A solution of bromoethyl-3-indolyl ketone (2.38 g.) and 4-aminopyridine (0.94 g.) in ethanol (50 ml.) was refluxed for 5 hours. 4-amino-1-[2-(3-indolyl)-2-oxoethyl]-pyridinium bromide (2.62 g., 79%), M.P. 312–315° C. crystallized on cooling. This quaternary salt (2.48 g.) was finely ground and suspended in 95% ethanol (300 ml.) containing triethylamine (3 ml.) and W7 Raney nickel (ca. 2 g.) and hydrogenated at 800 p.s.i. and 80° C. for 5 hours. The catalyst was filtered off and the filtrate was evaporated. The residue in water was made strongly basic and extracted three times with chloroform. After drying and evaporating the extracts, the residual solid was triturated with a little chloroform and filtered off. Recrystallization from ethanol-ether gave 3-[2-(4-amino-1-piperidyl)-1-oxoethyl]indole as needles (32%), M.P. 203–5° C.

(b) The amine (2.58 g.) was finely ground and suspended in chloroform (100 ml.). A solution of potassium carbonate (2.75 g.) in water (20 ml.) was added and the mixture was stirred and ice-cooled while benzoyl chloride (1.41 g.) in chloroform (20 ml.) was added dropwise. The solid formed was filtered off, washed and dried to give the title compound as colorless microcrystals (3.28 g., 91%), M.P. 204–6° C.

Found (percent): C, 72.94; H, 6.47; N, 11.48. $C_{22}H_{23}N_3O_2$ requires (percent): C, 73.10; H, 6.41; N, 11.63.

EXAMPLE 42

3-[2-(4-[4-chlorobenzamido]-1-piperidyl)-1-oxoethyl]indole

The procedure of Example 41(b) was followed but replacing the benzoylchloride by p-chlorobenzoyl chloride to give the title compound in 83% yield, M.P. 231–233° C.

Found (percent): C, 66.7; H, 5.7; N, 10.6. $C_{22}H_{22}ClN_3O_2$ requires (percent) C, 66.7; H, 5.6; N, 10.6.

EXAMPLE 43

3-[2-(4-[4-methoxybenzamido]-1-piperidyl)-1-oxoethyl]indole

The procedure of Example 41(b) was followed but replacing the benzoyl chloride by p-methoxybenzoyl chloride to give the title compound in 74% yield, M.P. 227–9° C.

Found: (percent) C, 70.4; H, 6.4; N, 10. $C_{23}H_{25}N_3O_3$ requires (percent): C, 70.6; H, 6.4; N, 10.7.

EXAMPLE 44

3-[2-(4-benzamido-1-piperidyl)ethyl]-5-methoxy-2-methylindole (a) 5-methoxy-2-methylindole-3-acetic acid (50 g.) in tetrahydrofuran (400 ml.) was added dropwise to a stirred suspension of lithium aluminum hydride (50 g.) in tetrahydrofuran (800 ml.). The mixture was heated under reflux for 1 hour, then water (150 ml.) was added dropwise and the inorganic material was filtered off and washed well by suspending in ether. Evaporation of the combined filtrate and washing provided 3-(2-hydroxy)ethyl-5-methoxy-2-methylindole as a crystalline solid (45.3 g., 96.7%), M.P. 98–101° C.

(b) The foregoing alcohol (45.3 g.) was added as quickly as possible to boiling 48% hydrobromic acid (450 ml.). One minute later the solution was poured onto ice (1 kg.) and extracted with ether. The extracts were washed twice with saturated sodium bicarbonate solution, dried over potassium carbonate and evaporated to provide 3-(2-bromo)ethyl-5-methoxy-2-methylindole as an oil (56.3 g.). This oil was dissolved in acetonitrile (225 ml.) and a solution of 4-acetamidopyridine (28.4 g.) in acetonitrile (120 ml., warmed to effect dissolution) was added. After three hours at room temperature the crystalline product was collected (in three crops) to give 4-acetamido-1-[2-(5-methoxy - 2 - methylindol-3-yl)ethyl]pyridinium bromide (58.7 g., 81.7%), M.P. 258–9° C. after recrystallization from ethanol.

The pyridinium bromide (13.64 g.) was dissolved in methanol (600 ml.) and sodium borohydride (27 g.) was added portionwise with stirring and ice-cooling. Stirring was continued for 2 hours while the mixture warmed to room temperature, then the methanol was distilled out in vacuo and water was added to the residue. Extraction with chloroform and evaporation of the dried extracts gave a brown foam which was dissolved in acetonitrile. Ether was added and the resulting precipitate was filtered off and discarded. This was repeated twice, then the final filtrate was evaporated and the residue crystallized from acetonitrile to give 3-[2-(4-acetamido-1,2,5,6-tetrahydropyrid-1-yl)ethyl]-5-methoxy-2-methylindole as colorless needles (6.27 g., 57%), M.P. 176–178° C.

(d) The foregoing tetrahydropyridine (4.66 g.) in 50% aqueous acetic acid (50 ml.) was hydrogenated for 18 hours at 50 p.s.i. and 50° C. in the presence of platinum oxide (500 mg.). After filtering off the catalyst and evaporating the filtrate in vacuo the residue was dissolved in water and basified with potassium carbonate. Extraction with chloroform and evaporation of the dried extracts gave a foam which was chromatographed on Woelm basic alumina, the eluant being chloroform. The product was obtained from two 50 ml. fractions and recrystallized from ethyl acetate to give 3-[2-(4-acetamido-1-piperidyl)-ethyl]-5-methoxy-2-methylindole as colorless prisms (3.27 g., 70%), M.P. 193–195° C.

(e) This acetamido compound (2.124 g.) was then hydrolysed following the procedure of Example 15(b) to give 3-[2-(4-amino-1-piperidyl)ethyl]-5-methoxy-2-methylindole as an oil which crystallized on standing (2.26 g.). This amine was dissolved in chloroform (40 ml.) and benzoylated following the procedure of Example 16 to give the title compound as colorless prisms from ethyl acetate (1.49 g.), M.P. 180–181° C.

Found (percent): C, 73.24; H, 7.50; N, 11.10. $C_{24}H_{29}N_3O_2$ requires (percent): C, 73.62; H, 7.47; N, 10.73.

What is claimed is:

1. An indole having the formula:

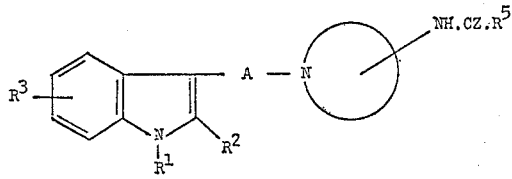

in which

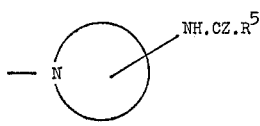

represents a ring system of formula

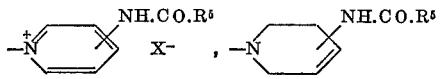

or

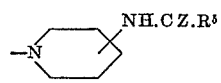

$R^1$ represents hydrogen, methyl or benzyl, $R^2$ represents hydrogen or methyl, $R^3$ represents hydrogen or methoxy, $R^5$ represents phenyl, 3-indolyl, 2-furyl, diphenylmethyl, benzyloxy, or phenyl monosubstituted by chlorine, bromine, lower alkyl, carboxy, methylenedioxy, trifluoromethyl or phenyl, or represents phenyl substituted up to three times by lower alkoxy, A represents an ethylene or a 1-oxoethylene biradical, and Z is an oxo- group or, when A is ethylene and $R^5$ is phenyl, may also represent two hydrogen atoms, and X is an anion of a pharmaceutically acceptable acid.

2. A compound according to claim 1 in which is 3-benzamido-1-[2-(3-indolyl)ethyl]pyridinium bromide.

3. A compound according to claim 1 in which is 3-[2-(4-benzamido-1,2,5,6-tetrahydropyrid-1-yl)ethyl]indole.

4. A compound according to claim 1 which is 3-[2-(3-benzamido-1,2,5,6-tetrahydropyrid-1-yl)ethyl]indole.

5. A compound according to claim 1 which is 3-[2-(4-[4 - chlorobenzamido] - 1,2,5,6 - tetrahydropyrid - 1 - yl)ethyl]indole.

6. A compound according to claim 1 which is 3-[2-(4-benzylaminopiperid-1-yl)ethyl]indole.

7. A compound according to claim 1 which is 3-[2-(4-benzamido-1-piperidyl)ethyl]indole.

8. A compound according to claim 1 which is 3-[2-(3-benzamido-1-piperidyl)ethyl]indole.

9. A compound according to claim 1 which is 3-[2-(4-[4-chlorobenzamido]-1-piperidyl)ethyl]indole.

10. A compound according to claim 1 which is 3-[2-(4-[4-methoxybenzamido]-1-piperidyl)ethyl]indole.

11. A compound according to claim 1 which is 3-[2-(4-[3-methoxybenzamido]-1-piperidyl)ethyl]indole.

12. A compound according to claim 1 which is 3-[2-(4-[2-methoxybenzamido]-1-piperidyl)ethyl]indole.

13. A compound according to claim 1 which is 3-[2-(4-[3,4,5-trimethoxybenzamido]-1-piperidyl)ethyl]indole.

14. A compound according to claim 1 which is 3-[2-(4-[indol-3-carboxamido]-1-piperidyl)ethyl]indole.

15. A compound according to claim 1 which is 3-[2-(4-[2-methylbenzamido]-1-piperidyl)ethyl]indole.

16. A compound according to claim 1 which is 3-[2-(4-[3-methylbenzamido]-1-piperidyl)ethyl]indole.

17. A compound according to claim 1 which is 3-[2-(4-[4-methylbenzamido]-1-piperidyl)ethyl]indole.

18. A compound according to claim 1 which is 3-[2-(4-[2-furylcarboxamido]-1-piperidyl)ethyl]indole.

19. A compound according to claim 1 which is 3-[2-(4-benzamido-1-piperidyl)ethyl]-2-methylindole.

20. A compound according to claim 1 which is 3-[2-(4-[2-chlorobenzamido]-1-piperidyl)ethyl]indole.

21. A compound according to claim 1 which is 3-[2-(4-[3,4 - methylenedioxybenzamido] - 1 - piperidyl)ethyl]-indole.

22. A compound according to claim 1 which is 3-[2-(4-[4-chlorobenzamido]-1-pipridyl)ethyl]-1-methylindole.

References Cited

UNITED STATES PATENTS

| | | | |
|---|---|---|---|
| 2,701,797 | 2/1955 | Swain | 260—294 |
| 3,075,986 | 1/1963 | Jacob et al. | 260—294.7 |
| 3,183,235 | 5/1965 | Zenitz | 260—294 |
| 3,198,807 | 8/1965 | Thominet | 260—319 |
| 3,238,215 | 3/1966 | Zenitz | 260—293 |
| 3,462,440 | 8/1969 | Childress | 260—293 |

HENRY R. JILES, Primary Examiner

G. T. TODD, Assistant Examiner

U.S. Cl. X.R.

260—240, 294, 294.3, 295, 295.5, 319.1, 326.12, 326.16; 424—263, 267